United States Patent
Boyle et al.

(10) Patent No.: US 7,206,555 B2
(45) Date of Patent: Apr. 17, 2007

(54) ANTENNA DIVERSITY SYSTEM AND METHOD FOR OPERATING SAID SYSTEM

(75) Inventors: Kevin Robert Boyle, Horsham (GB); Wilhelmus Mathias Clemens Dolmans, Eindhoven (NL); Lukas Leyten, Einhoven (NL); Peter Johan Massey, Horley (GB)

(73) Assignee: Koninklijke Philips Electronics N.V., Eindhoven (NL)

(*) Notice: Subject to any disclaimer, the term of this patent is extended or adjusted under 35 U.S.C. 154(b) by 149 days.

(21) Appl. No.: 10/523,389

(22) PCT Filed: Jun. 27, 2003

(86) PCT No.: PCT/IB03/02912

§ 371 (c)(1),
(2), (4) Date: Feb. 1, 2005

(87) PCT Pub. No.: WO2004/015813

PCT Pub. Date: Feb. 19, 2004

(65) Prior Publication Data

US 2006/0057975 A1    Mar. 16, 2006

(30) Foreign Application Priority Data

Aug. 5, 2002   (EP) ................... 02255475

(51) Int. Cl.
*H04B 1/02* (2006.01)
*H04B 1/06* (2006.01)
*H04B 7/02* (2006.01)

(52) U.S. Cl. ................... 455/101; 455/277.1

(58) Field of Classification Search ........... 455/101, 455/277.1, 277.2, 276.1, 278.1, 73, 279.1, 455/133, 137; 343/876, 815, 817, 818, 702
See application file for complete search history.

(56) References Cited

U.S. PATENT DOCUMENTS

| | | | |
|---|---|---|---|
| 6,049,310 A * | 4/2000 | Sadahiro | 343/702 |
| 6,211,830 B1 * | 4/2001 | Monma et al. | 343/702 |
| 6,657,595 B1 * | 12/2003 | Phillips et al. | 343/702 |
| 6,917,338 B2 * | 7/2005 | Bergervoet et al. | 343/702 |
| 2002/0025793 A1 * | 2/2002 | Meijer et al. | 455/277.1 |

OTHER PUBLICATIONS

M. Hamer, et al.; Experimental Vehicular Angle-Diversity Antenna Using Mutual Coupling; vol. 2; Jul. 1992 pp. 1089-1092;.

* cited by examiner

*Primary Examiner*—Aung Moe
(74) *Attorney, Agent, or Firm*—Larry Liberchuk

(57) ABSTRACT

The invention relates to an antenna diversity comprising a first and a second antenna element where the first antenna element is operated in an active mode whereas the second antenna element is operated in a parasitic mode. The present invention minimizes the amount of mismatch while still being able to maximize a predetermined signal quality criterion for the electromagnetic signal on the active path between the first antenna element and the transceiver. By providing a pre-selection unit 130 as well as a selection unit 140 for selecting an optimal adjustable impedance connected to the second antenna ensuring that the amount of said mismatch is below a predetermined threshold value and that simultaneously a predetermined quality criterion for the transceived electromagnetic signal is fulfilled best within the range determined by the allowable mismatch. The invention further relates to a method for operating such an antenna diversity.

5 Claims, 3 Drawing Sheets

ANTENNA DIVERSITY SYSTEM AND METHOD FOR OPERATING SAID SYSTEM

The invention relates to an Antenna diversity, comprising:

a first and a second antenna element, the first antenna element arranged for operating in an active mode and comprising a connection for connecting the first antenna element to a transceiver of said electronic device for transceiving electromagnetic signals and the second antenna arranged for operation in a parasitic mode by interfering the impedance of the first antenna element due to electromagnetic coupling;

wherein the antenna element in the parasitic mode is terminated by an adjustable impedance;

and to a method for operating an antenna diversity, the diversity including a first and a second antenna element, the first antenna element being operated in an active mode by being connected to a transceiver for transceiving electromagnetic signals and the second antenna element being operated in a parasitic mode by interfering the impedance of the first antenna element due to electromagnetic coupling to the first antenna element;

Antenna diversities are substantially known in the art. In comparison to single antennas the antenna diversities enable an enhanced quality of speech, less dropped calls and extended range even in those hostile signal environments which cause reflections or deflections of radio signals against buildings, tables, chairs, trees etc.

Figure 2:
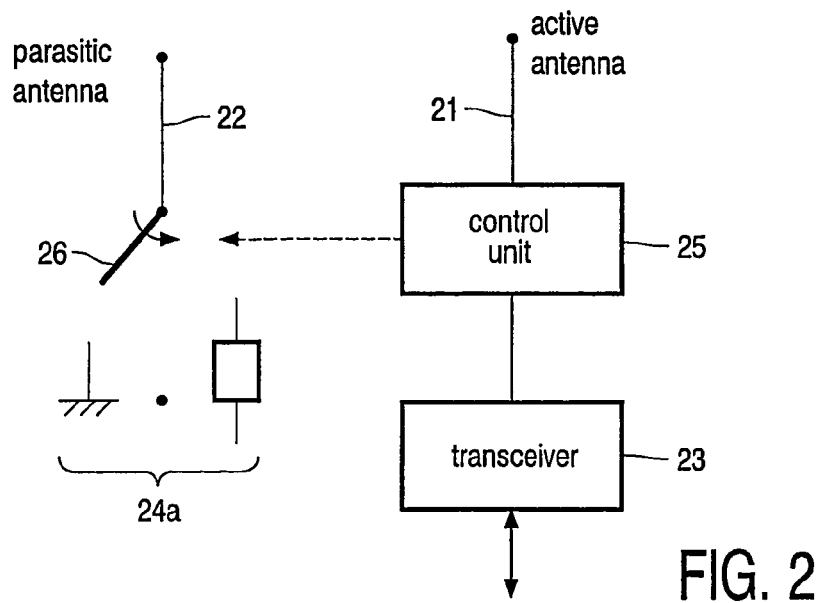

An example for a known antenna diversity is disclosed in the article of Scott, N. L., Leonard-Taylor, M. O. and Vaughan, R. G., "Diversity gain from a single-port adaptive antenna using switched parasitic elements illustrated with a wire and monopole prototype", IEEE Trans. on A & P, vol 47, No. 6, p. 1066–1070, June 1999. The antenna diversity disclosed in said article is shown in FIG. 2 and now briefly discussed.

According to FIG. 2 the antenna diversity comprises one active antenna 21, hereinafter also referred to as an antenna element being operated in an active mode. The diversity further comprises a parasitic antenna 22, hereinafter also referred to as the antenna element being operated in a parasitic mode. Whereas the active antenna 21 is connected to a transceiver 23 the parasitic antenna 22 is not connected to said transceiver 23. However, the parasitic antenna 22 and the active antenna 21 are located close to each other with the result that there is an electromagnetic coupling between the parasitic antenna 22 and the active antenna 21. The active antenna 21 originally has a fixed impedance (not shown). An impedance 24 connected to the parasitic antenna 22 is adjustable via a control unit 25 such that the radiation patterns of the signal to be tranceived via the active antenna 21 are optimized, i.e. such that there are only low correlated signals on the antenna.

More specifically, the control unit 25 operates as follows: By adjusting the impedance 24 connected to the parasitic antenna 22, the control unit 25 checks different impedances 24 connected to the parasitic antennas 22 with respect to their effect on the radiation pattern of active antenna 21.

The detected values for the strength of the signal are stored in a memory. Finally, that impedance combination which represents the optimal radiation pattern is selected and adjusted by the control unit 25. The described process of testing different impedances connected to the parasitic antenna 22 in order to detect that impedance which ensures the optimal radiation pattern is repeated from time to time in order to update the adjusted impedance of the parasitic antenna if necessary.

In FIG. 2 the adjustment of the impedance 24 is shown implemented as a switch selecting three impedance states. The changes in impedance 24 will, through the electromagnetic coupling between the parasitic antenna and the active antenna, result in changes to the impedance seen by the active antenna.

However, during operation of the antenna diversity according to FIG. 2 there still remains an undesired mismatch between the impedance of the active antenna 21 and impedance of the transceiver 23.

It is the object of the present invention to further minimize the amount of mismatch while still being able to maximize a predetermined signal quality criterion for the electromagnetic signal on the active path between the active antenna and the transceiver.

This object is solved by the subject matter of claim 1. More specifically, this object is solved by a pre-selection unit for adjusting the adjustable impedance ensuring that the amount of a mismatch between the impedance of the antenna element in the active mode and the impedance of the transceiver is below a predetermined threshold value, a selection unit for adjusting the adjustable impedance within a range determined by the preselection unit fulfilling a predetermined received signal quality criterion for the transceived electromagnetic signal best.

The predetermined signal quality criterion may e.g. be defined as maximal signal-to-noise ratio and/or as maximal signal strength and/or as maximal signal-to-interference ratio and/or as maximal signal-to-noise-plus-interference ratio.

Because the parasitic antenna element is placed close to the active antenna element changes in the termination impedance of the parasitic antenna have a large influence on the active antenne element. This means that in addition to the requirement of signal quality the requirement of match between the active antenna element on the transceiver must also be met. In the article of Scott, N. L., Leonard-Taylor, M. O. and Vaughan, R. G., "Diversity gain from a single-port adaptive antenna using switched parasitic elements illustrated with a wire and monopole prototype", IEEE Trans. on A & P, vol 47, No. 6, p. 1066–1070, June 1999 this is not an issue because the antenna elements are separated at a distance from each other such that a change in the termination impedance of one of the parasitic elements has substantially no effect on the match between the active antenna element and the transceiver.

The described embodiment of the invention has the advantage that due to the adjustment according to the finally selected specific configuration two requirements are fulfilled simultaneously: Firstly, the undesired mismatch is minimized, i.e. below the predetermined threshold value, and consequently, secondly, the degree of performance of the signal quality criterion of the transceived electromagnetic signal on the active path is maximal.

Further, impedance variations, i.e. changes of the impedance of the antenna element in the parasitic mode caused by the control unit can be kept below a predetermined threshold value with the result that in contrast to the prior art they do hardly not have any bad influence to the impedance of the active antenna; consequently, they can be considered as being eliminated.

The technical teaching of the invention might also be applied to a first group and a second group of antenna elements wherein the first group of antenna elements is operated in the parasitic mode and the second group of antenna elements is simultaneously operated in the active mode.

The above identified object of the present invention is further solved by the subject matter of independent method claim 2. The advantages of said method claim correspond to the advantages mentioned above with respect to claim 1.

Advantageously, the adjustment of the impedance of the parasitic antenna element is repeated occasionally or at predetermined times interval or after a change in the mismatch or after a change of received signal quality. These repetitions advantageously enable a proper adaptation of the selected and adjusted impedance configuration such that the degree of performance of the predetermined signal quality criterion for the electromagnetic signal on the active path is always maximized. Also when a change in mismatch or a change in received signal quality is detected, for instance due to a change in the presence of an object near the active antenna, an adjustment can be effected to ensure proper reception.

Further advantageous embodiments of the invention are subject matter of the remaining dependant claims.

To summarize: the present invention minimizes the amount of mismatch while still being able to maximize a predetermined signal quality criterion for the electromagnetic signal on the active path between the first antenna element and the transceiver. By providing a pre-selection unit 130 as well as a selection unit 140 for selecting an optimal adjustable impedance connected to the second antenna ensuring that the amount of said mismatch is below a predetermined threshold value and that simultaneously a predetermined quality criterion for the transceived electromagnetic signal is fulfilled best within the range determined by the allowable mismatch.

The description is accompanied by four figures, wherein

Figure 1:
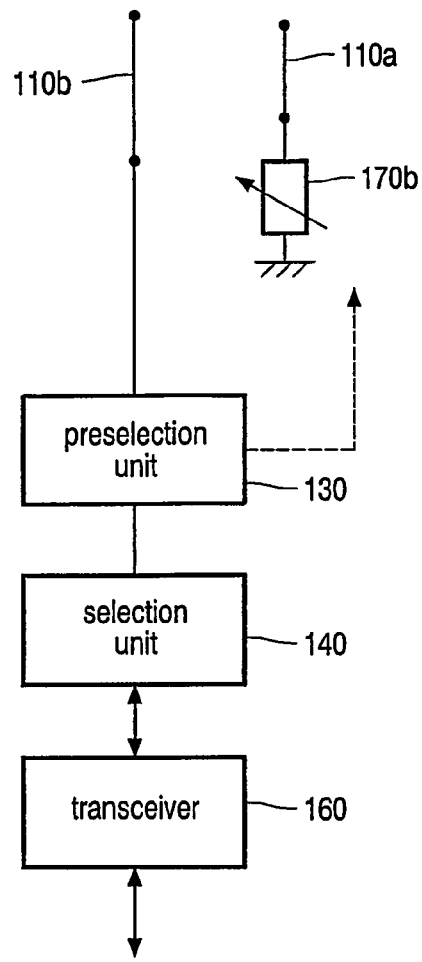

FIG. 1: shows a preferred embodiment of the antenna diversity according to the present invention; and FIG. 2: shows an antenna diversity known in the art.

Figure 3:
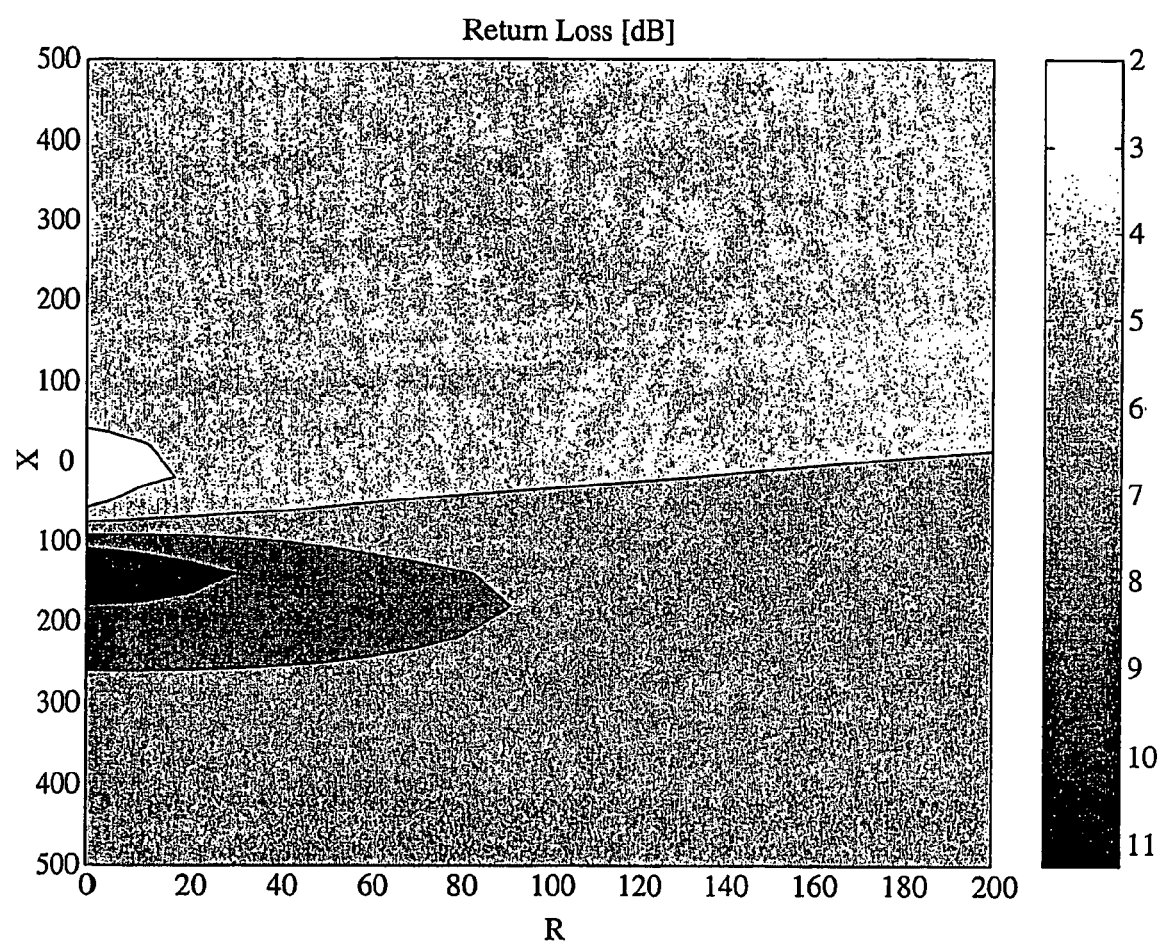

FIG. 3: shows the returnloss of the active antenna as a function of the adjustable impedance connected to the passive antenna.

Figure 4:
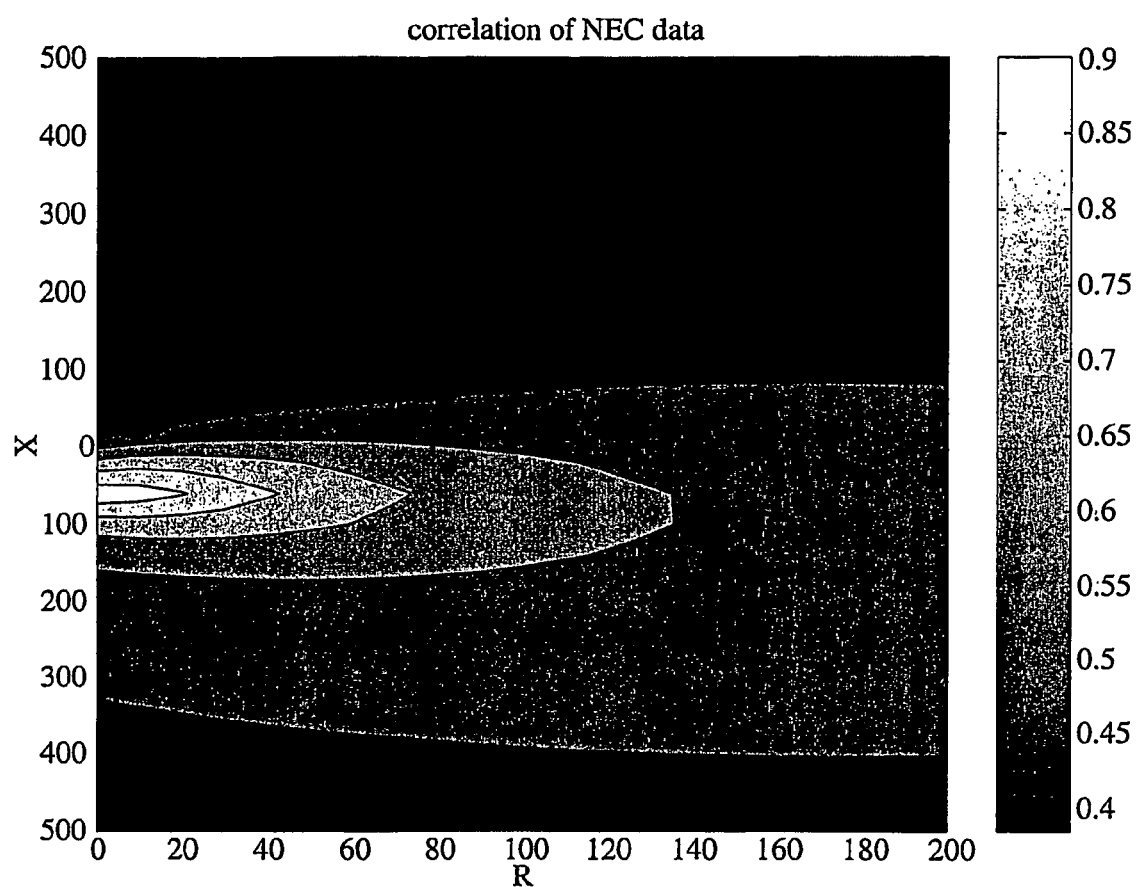

FIG. 4: shows an indication of the received signal quality as a function of the adjustable impedance connected to the passive antenna.

In the following the preferred embodiment of the invention will be described by referring to FIG. 1.

FIG. 1 shows an antenna diversity of an electromagnetic device, in particular of wireless and cellular terminals, like phones or pagers etc. It comprises a first antenna element 110a operated in the active mode and a second antenna element 110b operated in the parasitic mode. The active mode and the parasitic mode have already been described above by referring to FIG. 2.

The antenna diversity of the present invention further comprises a preselection unit 130 for testing all available configurations of the antenna diversity and finally selecting from all tested configurations those N-configurations ensuring that the amount of a mismatch between the impedance (not shown) of the antenna element in the active mode and the impedance of the transceiver 160 of the antenna diversity is below a predetermined threshold value. A detailed description of the operation of unit 130 is given below.

The term "configuration" means a parameter representing the selected or adjusted amount of the impedance of that antenna element which is operated in the parasitic mode.

Further, the antenna diversity comprises a selection unit 140 for selecting that single specific configuration out of the plurality of the N-configurations or range of configurations provided by the pre-selection unit 130 fulfilling a predetermined signal quality criterion for the transceived electromagnetic signal best.

In the following, the operation of the pre-selection unit 130 is described in more detail. More specifically, said operation comprises the steps of:

a1) operating the first antenna element in the active mode and the second antenna element in the parasitic mode;

a2) sequentially varying the impedance connected to the second antenna element to n1 different amounts and detecting the co-ordinated amounts of mismatch between the impedance of the first antenna element and the impedance of the transceiver (160) as well as the co-ordinated degree of performance of the signal quality criterion for the electromagnetic signal transceived by the first antenna element, respectively;

b) selecting and providing those N configurations out of the range of n1 configurations with $N \leq n1$ the amounts of impedance mismatch of which are below a predetermined threshold value.

FIG. 3 shows the returnloss of the active antenna as a function of the adjustable impedance connected to the parasitic antenna. The adjustable impedance connected to the parasitic antenna has a complex impedance which can be expressed as $R+jX$. FIG. 3 shows a 2 dimensional plot of the return loss of the active antenna as a function of the impedances $R+jX$ in the complex plane. For acceptable reception an impedance match of at least −8 dB is desirable. The selection unit determines the information as shown in FIG. 3 in order to obtain a range of possible configurations of the adjustable impedance. The range of possible configurations consists of one or more areas in the complex plane where the corresponding return loss is below a certain threshold value. The values of $R+jX$ comprised in these areas form the range of possible configurations for the adjustable impedance.

FIG. 4 shows an indication of the received signal quality as a fucntion of the adjustable impedance connected to the passive antenna. The data shown in FIG. 4 is not a direct plot of signal quality but is a plot of the correlation between the signal received when the adjustable impedance is held constant at $Z=-J50$ and the signal received when the adjustable impedance is changed to $Z=R+jX$ where R and JX form the axes of the plot in FIG. 4. A low value of correlation is desirable because for antenna diversity it is advantageous to have as little correlation as possible between received signals.

The selection unit now compares the range of configurations, i.e. the areas in the plot of FIG. 3 where the the value of $R+jX$ of the adjustable impedance leads to an acceptable return loss (and thus an acceptable mismatch) with the areas of low correlation values in the plot in FIG. 4 and selects within the range of configurations determined from the return loss data that configuration for which the correlation is lowest. This represents the best compromise between mismatch and received signal quality. If multiple ranges of configurations, depicted as areas in FIG. 3, of the adjustable impedance have acceptable returnloss values and multiple configurations offer comparable received signal quality additional selection criteria must be used to select a single configuration.

The invention claimed is:

1. Antenna diversity, comprising:
a first antenna element and a second antenna element, the first antenna element arranged for operating in an active mode and comprising a connection for connecting the first antenna element to a transceiver of said electronic device for transceiving electromagnetic signals and the second antenna arranged for operation in a parasitic mode by interfering the impedance of the first antenna element due to electromagnetic coupling, wherein the second antenna element in the parasitic mode is terminated by an adjustable impedance;

a pre-selection unit for adjusting the adjustable impedance ensuring that the amount of a mismatch between the impedance of the antenna element in the active mode and the impedance of the transceiver is below a predetermined threshold value, a selection unit for adjusting the adjustable impedance within a range determined by the pre-selection unit fulfilling a predetermined received signal quality criterion for the transceived electromagnetic signal best.

2. Method for operating an antenna diversity, the diversity including a first and a second antenna element, the first antenna element being operated in an active mode by being connected to a transceiver for transceiving electromagnetic signals and the second antenna element being operated in a parasitic mode by interfering the impedance of the first antenna element due to electromagnetic coupling to the first antenna element, the method comprising:

adjusting an adjustable impedance ensuring that the amount of a mismatch between the impedance of the antenna element in the active mode and the impedance of the transceiver is below a predetermined threshold value;

selecting the adjustable impedance within a range determined by a pre-selection unit fulfilling a predetermined received signal quality criterion for the transceived electromagnetic signal best.

3. Method according to claim 2, wherein said adjusting and selecting are repeated by selecting one of occasionally, after a predetermined time interval, after a change in the mismatch, and after a change of received signal quality.

4. Method according to claim 2, wherein the step of adjusting the adjustable impedance comprises sequentially varying the adjustable impedance of the second antenna element to n1 different amounts and detecting the co-ordinated amounts of mismatch between the impedance of the first antenna element and the impedance of the transceiver as well as the co-ordinated degree of performance of the signal quality criterion for the electromagnetic signal transceived by the first antenna element.

5. Integrated circuit comprising:

a transceiver and;

a first input for connecting a first antenna element to transceiver for transceiving electromagnetic signals and;

a second input for connecting a second antenna arranged for operation in a parasitic mode by interfering the impedance of the first antenna element due to electromagnetic coupling;

an adjustable impedance connected to the second input for terminating the second antenna element;

a pre-selection unit connected to the first input and comprising an output for adjusting the adjustable impedance where the pre-selection unit is operative to ensure that the amount of a mismatch between the impedance of the antenna element in the active mode and the impedance of the transceiver is below a predetermined threshold value, a selection unit connected to the preselection unit and to an output of the transceiver providing received signal quality information, where the selection unit is operative to adjust the adjustable impedance within a range determined by the pre-selection unit fulfilling a predetermined received signal quality criterion for the transceived electromagnetic signal best.

* * * * *